(12) United States Patent
Hou

(10) Patent No.: US 6,646,682 B1
(45) Date of Patent: Nov. 11, 2003

(54) LINEAR TRI-COLOR IMAGE SENSORS

(75) Inventor: Alpha Hou, San Jose, CA (US)

(73) Assignees: Syscan (Shenzhen) Technology Co., Limited, Guangdong (CN); Syscan, Inc., San Jose, CA (US)

( * ) Notice: Subject to any disclaimer, the term of this patent is extended or adjusted under 35 U.S.C. 154(b) by 0 days.

(21) Appl. No.: 09/216,279

(22) Filed: Dec. 18, 1998

(51) Int. Cl.[7] .......................... H04N 3/14; H04N 5/335; H04N 9/04; H04N 9/083
(52) U.S. Cl. ....................... 348/280; 348/324
(58) Field of Search .................. 348/315, 280, 348/322, 324, 272, 273; 257/234, 440; 358/505, 512, 513

(56) References Cited

U.S. PATENT DOCUMENTS 3,971,065 A    7/1976   Bayer
6,184,929 B1 *  2/2001  Noda et al. ............... 348/315
6,346,969 B1 *  2/2002  Kwon ........................ 281/15.1

* cited by examiner

*Primary Examiner*—Wendy R. Garber
*Assistant Examiner*—Justin Misleh
(74) *Attorney, Agent, or Firm*—Joe Zheng

(57) ABSTRACT

An improved color image linear sensor is disclosed to minimize the registration problems commonly seen in a sensor using three rows of photodetectors. In particular, according to one embodiment, the photodetectors in the improved color image linear sensor are shaped in triangle so that the triangular-like shaped photodetectors are interspersed with the upside-down triangular-like shaped photodetectors.

15 Claims, 5 Drawing Sheets

| G1 | R2 | G3 | B4 | G5 | R6 | G7 | B8 | G9 | R10 | G11 | B12 | G13 | R14 | G15 | B16 | G17 | R18 | G19 | B20 |

LINEAR TRI-COLOR IMAGE SENSORS

BACKGROUND OF THE INVENTION

1. Field of the Invention

The present invention generally relates to image sensing systems and more particularly relates to a linear image sensor with tricolored photodetectors.

2. Description of the Related Art

There are many applications that need an image scanning system to convert a scanning object to an electronic format that can be subsequently analyzed, printed, distributed and archived. The electronic format is generally an image of the scanning object. A typical example of the image scanning system is a scanner and the scanning object is a sheet of paper from a book or an article. Through the scanner, an electronic or digital image of the paper is generated.

An image scanning system generally includes a sensing module that converts a target optically into an image. The key element in the sensing module that converts the target optically to the image is an image sensor comprising an array of photodetectors responsive to light impinged upon the image sensor. Each of the photodetectors produces an electronic (charge) signal representing the intensity of light reflected from the target. The electronic signals from all the photodetectors are readout and then digitized through an analog-to-digital converter to produce digital signal or image of the target.

One of the image sensors used in the image scanning system is a linear sensor comprising three lines of photodetectors respectively superimposed upon with selectively transmissive filters in registration with each of the photodetectors. FIG. 1 illustrates a sample linear image sensor 100 comprising three rows 102, 104, 106 of photodetectors, each row being behind one kind of transmissive filter sensitive to a particular spectral region. For example, all photodetectors in row 102, 104 and 106 are respectively superimposed upon with a red filter, a green filter and a blue filter. Therefore image sensor 100 produces three electronic signals simultaneously when photodetectors in image sensor 100 are exposed to a scanning object illuminated by a white illumination source.

One of the noticeable problems associated with image sensor 100 is the requirement of auxiliary memory line buffers and processes to repackage electronic signals to precisely represent each registered image pixel. Because three photodetectors in each of the three rows are not physically registered to one scanning dot due to gaps among rows of photodetectors and associated circuits respectively supporting the photodetectors, a pixel registration process has to take place before the electronic signals or subsequent digital signals result therefrom can be used.

There have been some efforts to minimize the registration problem. One method is to reduce the gap between two rows of photodetectors by reducing the size of the photodetectors so that corresponding photodetectors in each of the three rows can be barely registered. However, a significant reduction of the photodetector size can introduce image sensitivity problems. Therefore there is a great need for a color image sensor that presents no registration problems and requires minimum memory buffers and processes to output a satisfactory type and quality of color image signals.

SUMMARY OF THE INVENTION

The present invention has been made in consideration of the above described problems and needs and has particular applications to image sensors used in scanners, facsimile machines and photo copy machines. As the features and advantages described below, the present invention can be advantageously used in portable scanning devices.

An image scanning system generally includes a sensing module that converts a target optically into an image. The key element in the sensing module that converts the target optically to the image is an image sensor. When an image scanning system employs the disclosed color image sensor, the memory buffer and processes used to repackage electronic signals from the photodetectors can be eliminated, scanning speed can be improved. In addition, when a black-and-white scanning object is scanned, the image resolution is inherently doubled due to a unique arrangement of the photodetectors in the image sensor.

According to one aspect of the present invention, the disclosed color image sensor comprises a row of photodetectors, every other one of the photodetectors being of a triangular-like shape and every another one of the photodetectors being of an upside-down triangular-like shape; a filter made of individual filter elements superimposed in one-to-one registry on the photodetectors; and wherein every other one of the filter elements has a first spectral transparent characteristic, every another one of the filter elements has one of a second spectral transparent characteristic and a third spectral transparent characteristic.

Objects and advantage together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
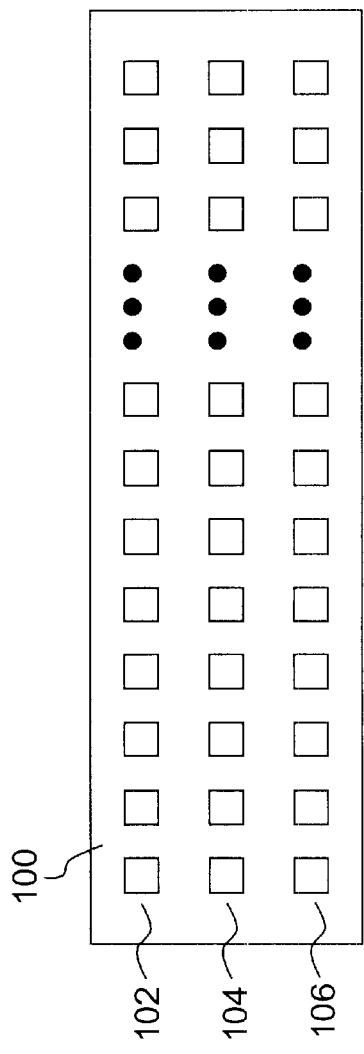
FIG. 1 illustrates an exemplary color image sensor comprising three rows of photodetectors.

In the following detailed description of the present invention, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well known methods, procedures, components, and circuitry have not been described in detail to avoid unnecessarily obscuring aspects of the present invention.

A color image typically comprises three intensity images respectively produced from exposures to three primary color components of a color object. One of the common methods to cause the exposures to the three primary color components is to use an image sensor comprising a plurality of photodetectors superimposed with a mosaic filter made of many selectively transmissive filters in registration with each of the photodetectors so that a first, second and third selective group of the photodetectors are made to sense the red, green and blue region of the visible spectrum, respectively. Hence only red, green and blue components can pass through the filters so that three respective intensity images are obtained.

Typically each of the intensity images or more precisely the digital version thereof is an array or matrix of pixels having a value between 0 to 255 if presented in an 8-bit precision. Alternatively, each color pixel C(i,j) in a color image is a vector pixel that may be expressed as follows:

$$C(i, j) = \begin{bmatrix} R(i, j) \\ G(i, j) \\ B(i, j) \end{bmatrix}$$

where (i,j) are coordinates of a color image pixel and C refers to the color image and R, G and B are the respective three intensity images in color image C. The above expression also indicates that a color pixel can be validly expressed only if the intensity components R(i,j), G(i,j) and B(i,j) are registered, namely all from a same spot in a color object.

If a cluster S of corresponding pixels in each of the three intensity images have an identical value, namely R(i,j)=G(i,j)=B(i,j), where (i,j) is within S, a spot in the color object corresponding to the cluster S must be colorless, visually somewhere from dark to white. Conversely if the cluster S of the pixels in each of the three intensity images have different values, i.e. R(i,j)≠G(i,j)≠B(i,j), the spot in the color object corresponding to the cluster S should be visually colorful. For example, a pure red, green or blue vector pixel are expressed as C (i,j)=[255 0 0]$^T$, C(i,j)=[0 255 0]$^T$ or C(i,j)=[0 0 255]$^T$, respectively. To ensure that the color object can be exactly reproduced in a color image, a color imaging system must be carefully controlled to produce the intensity images that can be combined to reproduce the colors of the color object in the resultant color image.

According to one embodiment of the present invention, the image sensor considered herein is a linear array or linear sensor, which means the image sensor generates one line of color signals at a time. A consecutive composition of all the color signals will generalize a color image. Without losing the generality, the image sensor illustrated herein produces three color signals, red, green and blue intensity signals, each from a color filtered exposure.

Figure 2A:
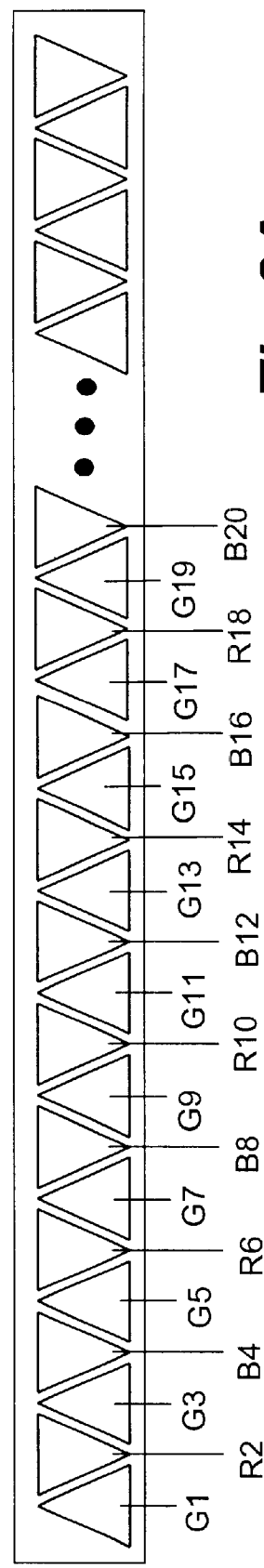
FIG. 2A shows an improved color image sensor according to one embodiment of the present invention.

FIG. 2A shows a layout diagram of an improved image sensor 200 in which the present invention is practiced. Image sensor 200 is fabricated in either Complementary Metal-Oxide Semiconductor (CMOS) or Charged Couple Device (CCD) and comprises a plurality of triangular-shaped photodetectors, of which first 20 are respectively labeled as G1, R2, G3, B4, G5, R6, G7, B8, G9, R10, G11, B12, G13, R14, G15, B16, G17, R18, G19 and B20.

As shown in the figure, the triangular-shaped photodetectors are arranged in such a way that the triangular-shaped photodetectors have no or minimum vertical and horizontal gaps among resultant color pixels. To be more specific, all the (upside) triangular-shaped photodetectors, such as G1, G3, G5, G7, G9, G11, G13, G15, G17 and G19, are coated or superimposed with a transmissive filter sensitive to the "Green" spectral region (and referred to green photodetectors herein), and all the upside-down triangular-shaped photodetectors, such as R2, B4, R6, B8, R10, B12, R14, B16, R18, and B20, are alternatively and respectively coated or superimposed with a transmissive filter sensitive to the "Red" and "Blue" spectral region (and referred to red and blue photodetectors herein). It is clearly shown in the figure that those red and blue photodetectors are alternatively interspersed with the green photodetectors. Alternatively, it is said that each of the upside-down triangular-shaped (red or blue) photodetectors is interspersed between each two of the triangular-shaped (green) photodetectors.

Figures 2B, 2C:
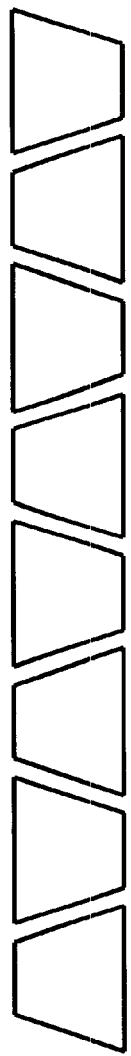
FIG. 2B shows image pixels corresponding to the photodetectors in the color image sensor of FIG. 2A.
FIG. 2C shows sampling of a line signal from an image sensor being sequential and uniform.

In addition, an upside-down triangle is considered herein a complimentary shape to a triangle. In other words, when it is generally referred that a first shape is a complimentary shape to a second shape, that means that the first shape identical to the second shape, when upside down, can be interlocked or mated with the second shape. For example, FIG. 2B illustrates another possible shape, namely a portion of the shape mated well into a corresponding upside-down shape. It is noted that a square or a circle is not considered complimentary because it can not be mated with another square.

As a result of this arrangement, sampling of a line signal from image sensor 200 is sequential and uniform as is readily seen from FIG. 2C. More importantly, the arrangement minimizes gaps between two adjacent color pixels in horizontal direction that the commonly used square-shaped photodetectors can hardly achieve. Thus the registration problem commonly seen in the color image sensors has been considerably reduced.

Figure 3:
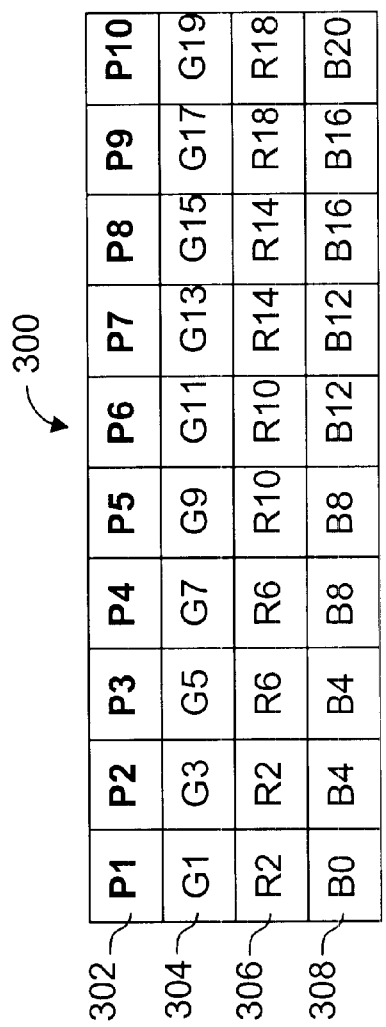
FIG. 3 demonstrates color components in a set of exemplary color pixels.

To represent the vector pixels, FIG. 3 shows how a color pixel is formed from the unique arrangement without introducing pixel registration problems and should be understood in conjunction with FIG. 2A and FIG. 2C. Table 300 lists 10 sample color pixels generated from image sensor 200 of FIG. 2A. Row 302 lists ten pixels, P1, P2, . . . , P10. Row 304, 306 and 308 show respective green, red and blue components for each of the color pixels. As also meant herein, a red, green, or blue photodetector means that a photodetector is responsive only to red, green, or blue color.

To be specific, a signal from each green photodetector represents one component of a color pixel and a respective signal from each red and blue photodetector becomes a respective common component in two adjacent color pixels. For example, two adjacent color vector pixels (e.g., P1 and P2) have a green component from two different green photodetectors but share the same red or blue signals from the same red or blue photodetector. As a result, the horizontal gap between two color pixels is minimized without causing a loss of image resolution. Further it can be readily seen in FIG. 3 in reference to FIG. 2A that color pixels in terms of the photodetectors occur at a regular interval. Hence a uniform sampling from the photodetectors is guaranteed.

It should be pointed out that the above description regarding the present invention is based on an implementation of using red, green and blue photodetectors. Those skilled in the art may appreciate that the description is equally applied when other primary or complementary color filters are used. For example magenta, yellow and cyan are a set of common alternative complementary colors that can be used to produce color images. In addition, having a set of green photodetectors interleaved or interspersed with alternating red and blue photodetectors is not a request to practice the present invention. It is, however, a preferred implementation in reality as the human vision system is more sensitive to colors in the green area than other colors in a color spectrum.

Figure 4:
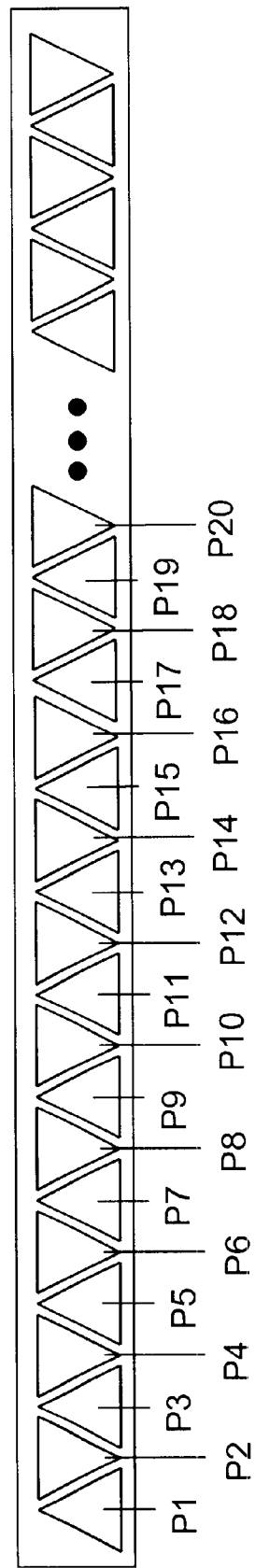
FIG. 4 shows how the photodetectors are considered when the image sensor is used to scan a black-and-white scanning object.

In many applications, a color image sensor is used to scan a non-color object or simply a black-and-white object, such as a page from a textbook, and produce a black-and-white (gray or monochrome) image. That is an image reflecting only luminance. To ensure that each colored photodetector produces signals equally responsive to the reflection from the black-and-white scanning object, a set of weighting coefficient is used to balance the different spectral responses from the colored photodetectors as follows:

kG
1.967 kR
5.360 kB where k is an adjusting factor and typically is set to 1. In other words, signals from the green photodetectors can be directly mapped to the resultant gray image while signals from the red and blue photodetectors are augmented appropriately to be mapped to the resultant gray image. As a result, the resolution of the image sensor for the black-and-white scanning object is inherently doubled as shown in FIG. 4 in which each of the photodetectors can produce an image pixel in the resultant luminance image.

Figure 5A:
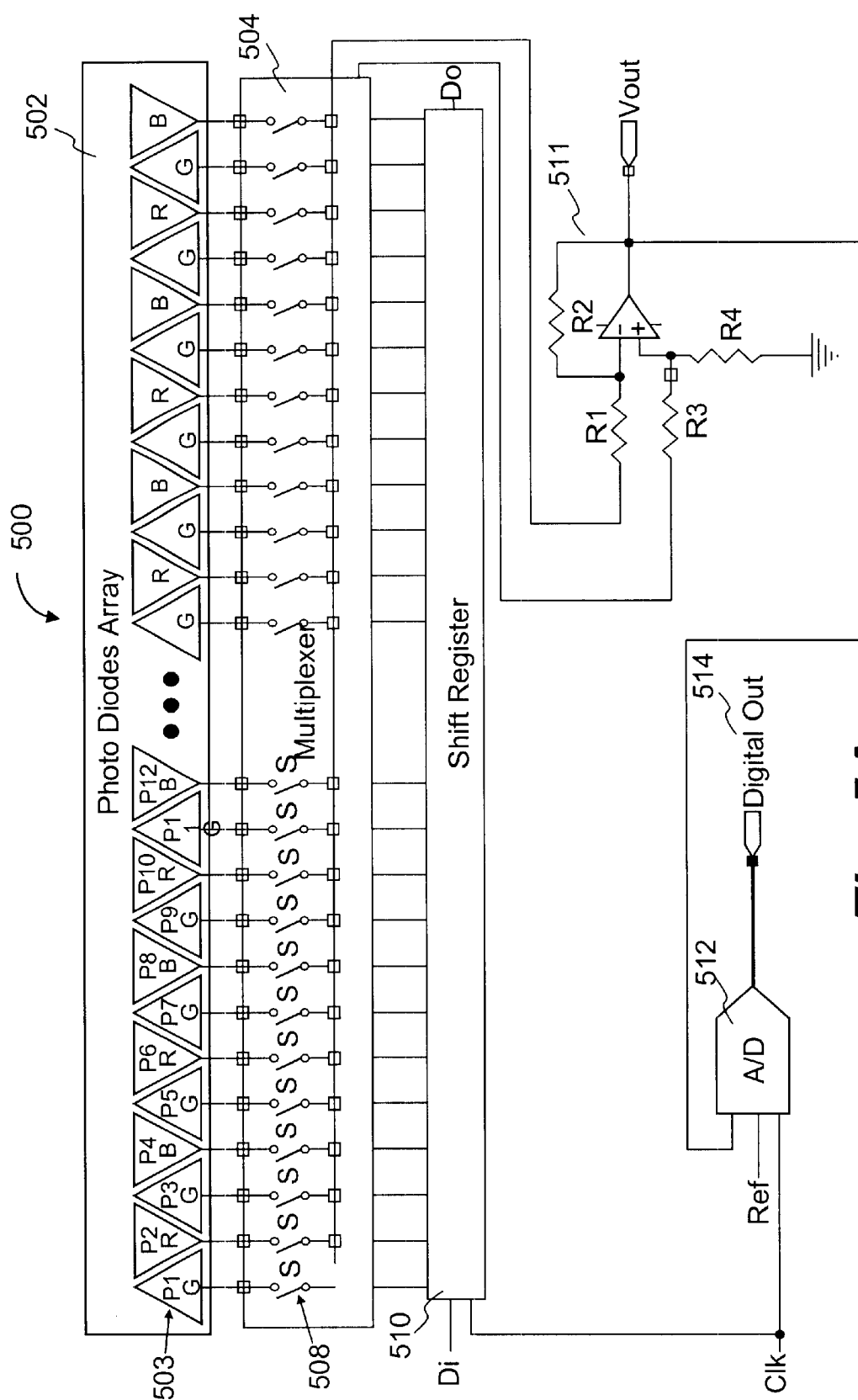
FIG. 5A illustrates a circuit diagram that may be used to readout electronic signals generated in the photodetectors of the image sensor in FIG. 2A.

Referring now to FIG. 5A, there is shown a simplified circuit diagram 500 that is used to readout signals generated by photodetectors in image sensor 502. Image sensor 502 may correspond to image sensor 200 of FIG. 2A and comprises a plurality of photodetectors 503 arranged in a line fashion. To minimize the registration problem in horizontal direction, the shape of the photodetectors is preferred to be triangular-like shaped. More specifically, a row of upside triangular-like shaped photodetectors is interspersed by a row of upside-down triangular-shaped photodetectors as shown clearly in the figure.

Multiplexer 504 comprises a plurality of diode switches 508, each of switches 508 is coupled to one of the photodetectors. Each of the switches in diode switches 508 is independently controlled by a switch signal. After the photodetectors are exposed to an illuminated scanning object, a control signal, not shown in the figure, causes the photodetectors from further accumulating light photons, generated charge signals to be stored in respective storage capacitors (not shown in the figure) and meanwhile switches 508 to turn on serially. Electronic signals in the storage capacitors from the photodetectors are then serially readout to amplifier 511.

Figure 5B:
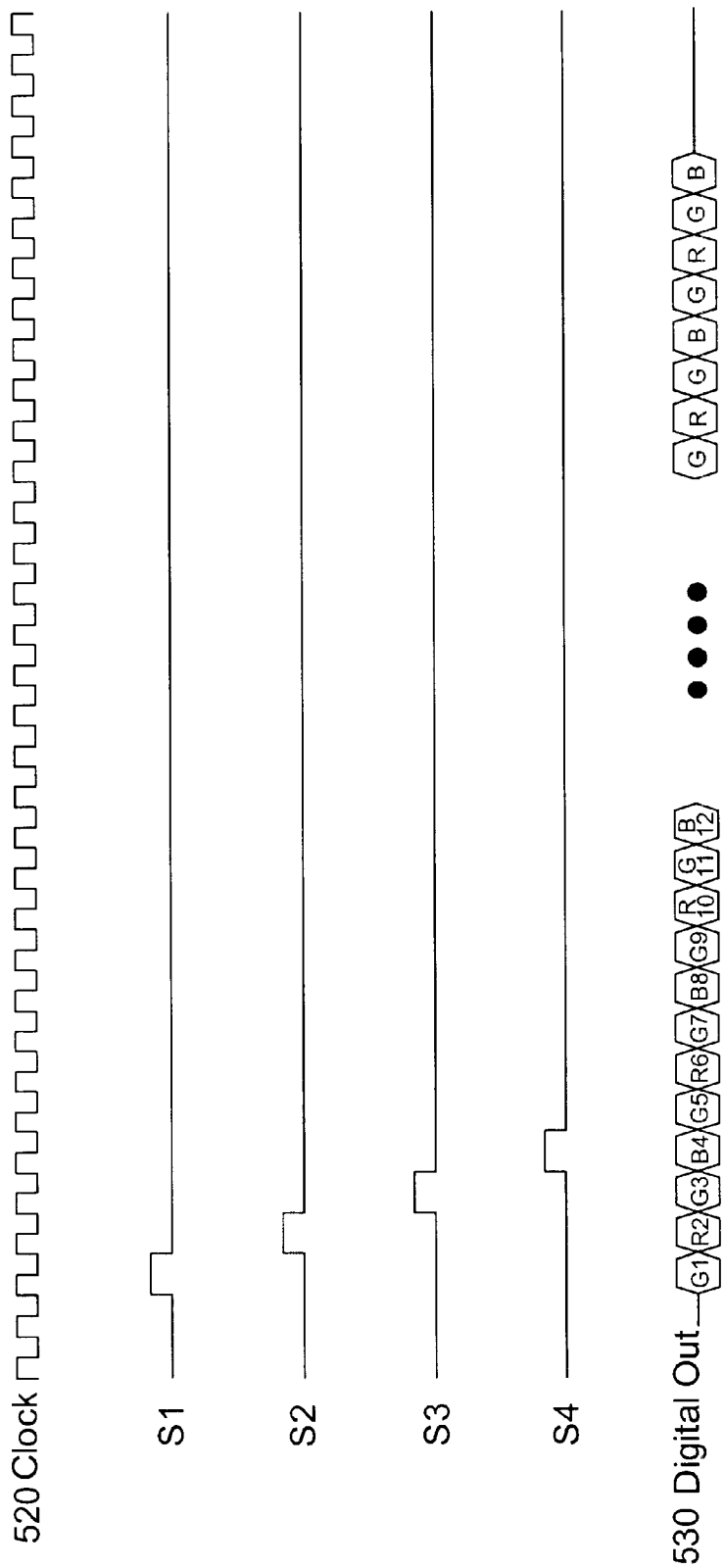
FIG. 5B illustrate a set of control signals used in the circuit of FIG. 5A.

The readout process is achieved by shift registers 510 that typically comprises the same number of individual shift registers as the photodetectors. For example, a pulse Di is fed into shift registers 510 and Di shifts from one shift register to another shift register by clocking signal CLK. When a shift register outputs Di, a corresponding switch in diode switches 508 is turned on (i.e. passing through) and a corresponding electronic signal in the corresponding storage capacitor is readout therefrom. As Di passes, the electronic signals in storage capacitors are thus serially shifted out and subsequently digitized by an A/D converter 512 that outputs digital signals 514. FIG. 5B illustrates a clock signal 520 from which many control signals can be derived and S1, S2, S3 and S4 are exemplary control signals (shifted Di) that turn on four consecutive switches. The digital signals 530 from A/D converter 512 are illustrated in FIG. 5B.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the preferred shape of the photodetectors is triangular-like shaped, those skilled in the art may appreciate that other shapes of the photodetectors may be so designed that the colored photodetectors can be closely and alternatively positioned to minimize the registration problem. Accordingly, the scope of the present invention is defined by the appended claims rather than the forgoing description of embodiments.

I claim:

1. A color image sensor comprising:
    a first type of photodetectors sensitive to a first spectral region;
    a second type of photodetectors sensitive to a second spectral region;
    a third type of photodetectors sensitive to a third spectral region; and
    the three types of photodetectors arranged in a row and in such a way that each of the first type of photodetectors is between one of the second type of photodetectors and one of the third type of photodetectors, wherein two adjacent color pixels from the color image sensor includes a first component respectively from two adjacent ones of the first type of photodetectors, an identical second component from one of the second type of photodetectors or an identical third component from one of the third type of photodetectors.

2. The color image sensor as recited in claim 1, wherein the first spectral region, the second spectral region, and the third spectral region form a complimentary color set that reproduces most of visible colors to a human vision system.

3. The color image sensor as recited in claim 2, wherein the first spectral region is green, the second spectral region is red, and the third spectral region is blue.

4. The color image sensor as recited in claim 1, wherein
    the first type of photodetectors is superimposed with a first transmissive filter responsive to the first spectral region;
    the second type of photodetectors is superimposed with a second transmissive filter responsive to the second spectral region; and
    the third type of photodetectors is superimposed with a third transmissive filter responsive to the third spectral region.

5. The color image sensor as recited in claim 1, wherein the color image sensor has a uniform sampling as a result of an arrangement of the first type, the second type and the third type of photodetectors.

6. The color image sensor as recited in claim 1, wherein each of the first type of photodetectors is of triangular-like shape and each of the second and third type of photodetectors is of complementary triangular-like shape.

7. The color image sensor as recited in claim 6, wherein the first type of photodetectors is sensitive to green color, the second type of photodetectors is sensitive to green and the third type of photodetectors is sensitive to red.

8. A color image sensor comprising:
    a row of photodetectors, every other one of the photodetectors being of a first shape and every another one of the photodetectors being of a second shape;
    a filter made of individual filter elements superimposed in one-to-one registry on each of the photodetectors;

wherein every one of the photodetectors with a first spectral transparent characteristic is between one of the photodetectors with a second spectral transparent characteristic and one of the photodetectors with a third spectral transparent characteristic; and wherein two adjacent color pixels from the color image sensor include a first component respectively from two adjacent photodetectors of the first spectral transparent characteristic, an identical second component from a photodetector of the second spectral transparent characteristic or an identical third component from a photodetector of the third spectral transparent characteristic.

9. The color image sensor as recited in claim 8, wherein the first shape and the second shape are complimentary so that there is a minimized registration gap between two adjacent image pixels.

10. The color image sensor as recited in claim 8, wherein the first shape is a triangle-like shape and the second shape is an upside-down triangle-like shape.

11. The color image sensor as recited in claim 10, wherein the first spectral transparent characteristic is green, the second spectral transparent characteristic is red and the third spectral transparent characteristic is blue.

12. A color image sensor comprising:

triangular-shaped photodetectors coated with a filter responsive to a first spectral region;

upside-down triangular-shaped photodetectors; and the triangular-shaped and upside-down triangular-shaped photodetectors arranged in a row and in such a way that each of the triangular-shaped photodetectors is between two of the upside-down triangular-shaped photodetectors, wherein two of the upside-down triangular-shaped photodetectors are respectively coated with a filter responsive to a second spectral region and a third spectral region; and wherein, when exposed to a non-colored scanning object, each of the photodetectors corresponding to an image pixel of a resultant image, signals from the photodetectors are adjusted by a factor selected from a group consisting of k, 1.967 k, and 5.360 k, to generalize the resultant image.

13. The color image sensor as recited in claim 12, wherein the first spectral region corresponds to green, the second spectral region corresponds to red, and the third spectral region corresponds to blue.

14. The color image sensor as recited in claim 12, wherein k is set to one.

15. The color image sensor as recited in claim 12, wherein two adjacent color pixels from the color image sensor includes a first component respectively from two adjacent ones of the triangular-shaped photodetectors, an identical second or third component from either one of the two of the upside-down triangular-shaped photodetectors respectively coated with the filter responsive to the second spectral region or the third spectral region.

* * * * *